United States Patent
Sum et al.

(10) Patent No.: US 10,379,526 B2
(45) Date of Patent: Aug. 13, 2019

(54) CONTROL DEVICE AND CONTROL METHOD FOR SERVO MOTOR SYSTEM

(71) Applicant: RDC Semiconductor Co., Ltd., Hsinchu (TW)

(72) Inventors: Wai-Loon Sum, Hsinchu (TW); Bo-Yuan Shih, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 768 days.

(21) Appl. No.: 14/973,013

(22) Filed: Dec. 17, 2015

(65) Prior Publication Data

US 2017/0060119 A1    Mar. 2, 2017

(30) Foreign Application Priority Data

Sep. 2, 2015  (TW) .............................. 104128960 A (51) Int. Cl.
*G05B 19/414* (2006.01)

(52) U.S. Cl.
CPC .. *G05B 19/414* (2013.01); *G05B 2219/34429* (2013.01); *G05B 2219/42237* (2013.01)

(58) Field of Classification Search
CPC ........... G03G 15/0194; G03G 15/5008; G03G 2215/0141; B41J 11/007; B41K 11/42
See application file for complete search history.

(56) References Cited

U.S. PATENT DOCUMENTS

| | | | |
|---|---|---|---|
| 7,979,158 B2 | 7/2011 | Sladek et al. | |
| 2007/0183282 A1* | 8/2007 | Oyabu | G11B 19/247 369/47.38 |
| 2008/0025781 A1* | 1/2008 | Koyama | B41J 13/0018 400/582 |
| 2015/0145454 A1* | 5/2015 | Kameyama | H02P 6/186 318/400.32 |

FOREIGN PATENT DOCUMENTS

| | | |
|---|---|---|
| TW | 486855 | 5/2002 |
| TW | 591878 | 6/2004 |
| TW | I337563 | 2/2011 |

* cited by examiner

*Primary Examiner* — Kawing Chan
*Assistant Examiner* — Zoheb S Imtiaz
(74) *Attorney, Agent, or Firm* — WPAT, PC (57) ABSTRACT

A control device for a servo motor system is provided. The control device includes a segment parameter storage circuit, a velocity superposing circuit, a velocity transferring circuit and a pulse comparison circuit. The segment parameter storage circuit is electrically connected with the velocity superposing circuit and the pulse comparison circuit. The velocity transferring circuit is connected between the velocity superposing circuit and the pulse comparison circuit. The velocity superposing circuit updates a present velocity value according to a target velocity value and an increment. The velocity transferring circuit generates a PWM signal according to the present velocity value. The pulse comparison circuit transfers the PWM signal into a signal of a command pulse wave group and judges whether a pulse number of the PWM signal reaches a predetermined pulse number.

17 Claims, 9 Drawing Sheets

CONTROL DEVICE AND CONTROL METHOD FOR SERVO MOTOR SYSTEM

This application claims the benefit of Taiwan Patent Application No. 104128960, filed Sep. 2, 2015, the subject matter of which is incorporated herein by reference.

FIELD OF THE INVENTION

The present invention relates to a control device and a control method, and more particularly to a control device and a control method for a servo motor system.

BACKGROUND OF THE INVENTION

As is well known, the velocity and the position of a servo motor can be controlled precisely. Consequently, servo motors have been widely used in various industrial automation industries and precision machining fields. For example, plural servo motors can be applied to mechanical arms or mechanical work platforms in order to provide multi-dimensional operations.

Figure 1:
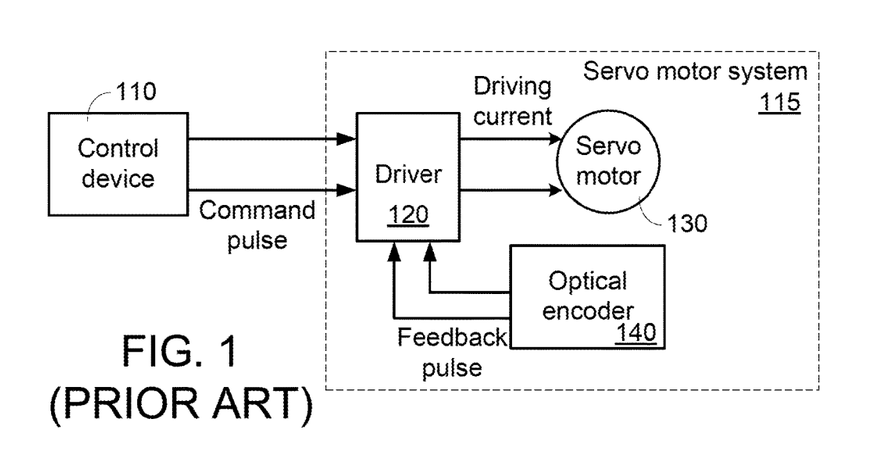
FIG. 1 (prior art) is a schematic functional block diagram illustrating the architecture of a servo motor system.

FIG. 1 is a schematic functional block diagram illustrating the architecture of a servo motor system. As shown in FIG. 1, the servo motor system 115 comprises a driver 120, a servo motor 130 and an optical encoder 140.

In response to the user's operation, a control device 110 issues a command pulse wave to the servo motor system 115 for controlling the velocity and the rotation direction of the servo motor 130. The servo motor system 115 is a close-loop control system. According to the command pulse wave and a feedback pulse wave, the driver 120 generates a driving current to the servo motor 130 in order to control the velocity and the rotation direction of the servo motor 130.

Moreover, according to the velocity and the rotation direction of the servo motor 130, the optical encoder 140 generates the feedback pulse wave to the driver 120. The optical encoder 140 is a feedback device. Alternatively, the optical encoder 140 may be replaced by any other appropriate device such as a resolver.

After the servo motor system 115 is installed on a mechanical arm or a mechanical work platform, the mechanical arm or the mechanical work platform can perform a one-dimensional operation according to the command pulse wave from the control device 110.

In case that three servo motor systems as shown in FIG. 1 are installed on a mechanical arm or a mechanical work platform, the mechanical arm or the mechanical work platform can perform a three-dimensional operation. In other words, the mechanical arm or the mechanical work platform performs the three-dimensional operation according to the command pulse waves from three control devices.

Therefore, there is a need of providing a method for immediately generating the command pulse wave and accurately controlling the velocity and position of the servo motor.

SUMMARY OF THE INVENTION

An embodiment of the present invention provides a control device for generating a command pulse wave group to a servo motor system. The control device includes a segment parameter storage circuit, a velocity superposing circuit, a velocity transferring circuit and a pulse comparison circuit. The segment parameter storage circuit stores plural segment parameters. Each segment parameter contains a target velocity value, an increment and a predetermined pulse number. After the segment parameter storage circuit outputs a first segment parameter and receives a segment stop signal, the segment parameter storage circuit outputs a second segment parameter. The velocity superposing circuit receives the target velocity value and the increment of the second segment parameter and generating a present velocity value. The preset velocity is changed from the target velocity value of the first segment parameter to the target velocity value of the second segment parameter. The velocity transferring circuit receives the present velocity value and generates a pulse width modulation signal according to the present velocity value. The pulse comparison circuit is used for transferring the pulse width modulation signal into a first signal of the command pulse wave group. The pulse comparison circuit receives the predetermined pulse number and counts a pulse number of the pulse width modulation signal. When the pulse number of the pulse width modulation signal reaches the predetermined pulse number, the pulse comparison circuit generates the segment stop signal.

Another embodiment of the present invention provides a control method for a control device. The control device generates a command pulse wave group to a servo motor system. The control method includes following steps. In a step (a), the servo motor system is controlled to stop a first segment and start a second segment in response to a segment stop signal. The command pulse wave group is generated according to the first segment parameter during the first segment. The command pulse wave group is generated according to the second segment parameter during the second segment. In a step (b), a target velocity value, an increment and a predetermined pulse number of the second segment parameter are received. In a step (c), a present velocity value is set as a target velocity value of the first segment parameter. Then, a step (d) is performed to judge whether a pulse number of a pulse width modulation signal reaches the predetermined pulse number. If the pulse number of the pulse width modulation signal reaches the predetermined pulse number, the second segment is stopped. In a step (e), if the pulse number of the pulse width modulation signal does not reach the predetermined pulse number, a judging step is performed to judge whether the present velocity value reaches the target velocity value. If the present velocity value reaches the target velocity value, the step (d) is repeatedly performed. In a step (f), if the present velocity value does not reach the target velocity value, the present velocity value is updated to a sum of the present velocity value and a modified increment, and the step (d) is repeatedly performed. The modified increment is equal to a product of the increment and a weighting value. The control device generates the pulse width modulation signal and determines a frequency of the pulse width modulation signal according to the present velocity value. The pulse width modulation signal is used as a first signal of the command pulse wave group.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Generally, the command pulse waves outputted from the control device may have various pulse formats. The pulse formats will be illustrated in more details as follows.

Figure 2A:
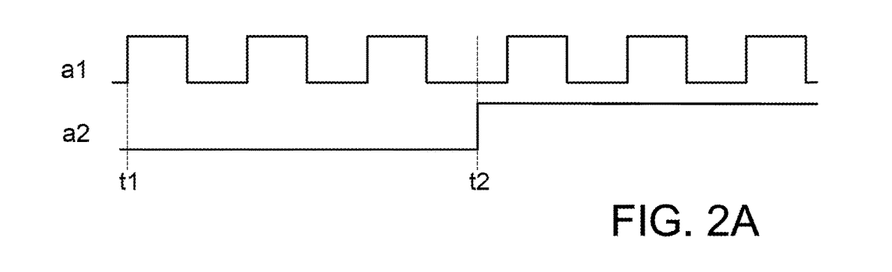
FIG. 2A is a schematic timing waveform diagram illustrating a command pulse wave group in a one pulse direction-pulse format.

FIG. 2A is a schematic timing waveform diagram illustrating a command pulse wave group in a one pulse direction-pulse format. The command pulse wave group contains two signals a1 and a2. The frequency of the signal a1 is correlated with the frequency of the driving current that is generated from the driver. The velocity of the servo motor is adjusted according to the frequency of the driving current. As the pulse frequency of the signal a1 increases or the pulse width of the signal a1 decreases, the velocity of the servo motor increases. Whereas, as the pulse frequency of the signal a1 decreases or the pulse width of the signal a1 increases, the velocity of the servo motor decreases. Moreover, the signal a2 indicates the rotation direction. The low-level state of the signal a2 indicates that the servo motor is controlled to be rotated in a first direction (e.g., a clockwise direction) after the time point t1. Whereas, the high-level state of the signal a2 indicates that the servo motor is controlled to be rotated in a second direction (e.g., a counterclockwise direction) after the time point t2.

Figure 2B:
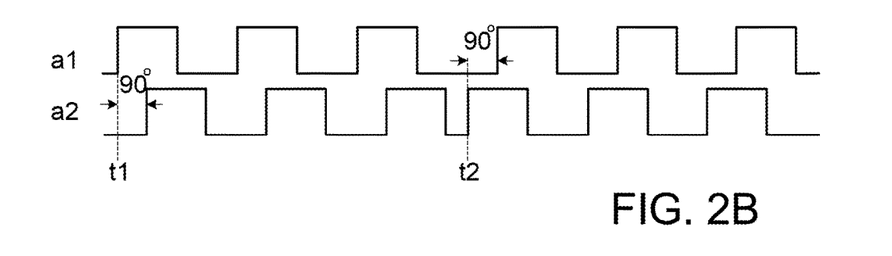
FIG. 2B is a schematic timing waveform diagram illustrating a command pulse wave group in an NB phase-pulse format.

FIG. 2B is a schematic timing waveform diagram illustrating a command pulse wave group in an NB phase-pulse format. The command pulse wave group contains two signals a1 and a2. In case that the phase of the signal a1 leads the phase of the signal a2 by 90 degrees, the servo motor is rotated in the first direction. Whereas, in case that the phase of the signal a1 lags the phase of the signal a2 by 90 degrees, the servo motor is rotated in the second direction. Consequently, the servo motor is controlled to be rotated in the first direction at the time point t1, and the servo motor is controlled to be rotated in the second direction at the time point t2. Similarly, the frequencies of the signals a1 and a2 are correlated with the speed of the servo motor.

Figure 2C:
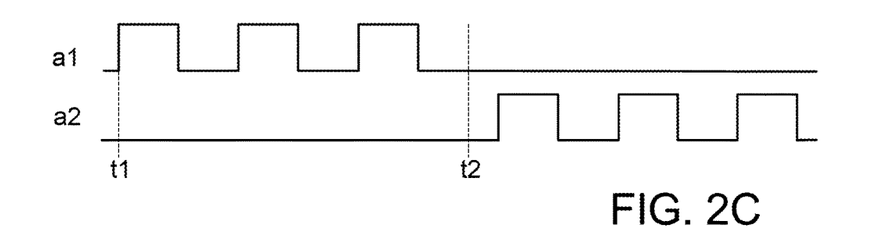
FIG. 2C is a schematic timing waveform diagram illustrating a command pulse wave group in a clockwise and counterclockwise-pulse format.

FIG. 2C is a schematic timing waveform diagram illustrating a command pulse wave group in a clockwise and counterclockwise-pulse format. The command pulse wave group contains two signals a1 and a2. When the signal a1 is activated, the servo motor is controlled to be rotated in the first direction. When the signal a2 is activated, the servo motor is controlled to be rotated in the second direction. That is, the servo motor is controlled to be rotated in the first direction at the time point t1, and the servo motor is controlled to be rotated in the second direction at the time point t2. Similarly, the frequencies of the signals a1 and a2 are correlated with the speed of the servo motor.

Generally, when the servo motor system receives one pulse, the driver controls the servo motor to rotate a specified angle. For example, the servo motor is rotated 1 degree in response to one pule of the one pulse direction command pulse wave group. That is, the servo motor is rotated 3600 degrees (i.e., 10 turns) in response to 3600 pules of the one pulse direction command pulse wave group. Consequently, by controlling the rotating angle of the servo motor, the position of the servo motor is correspondingly adjusted.

As the pulse frequency increases or the pulse width decreases, the velocity of the servo motor increases. Whereas, as the pulse frequency decreases or the pulse width increases, the velocity of the servo motor decreases. Consequently, by controlling the pulse frequency of the one pulse direction command pulse wave group, the velocity of the servo motor is correspondingly adjusted. The command pulse wave group in an NB phase-pulse format and the command pulse wave group in a clockwise and counter-clockwise-pulse format have similar operating principles.

Figure 3:
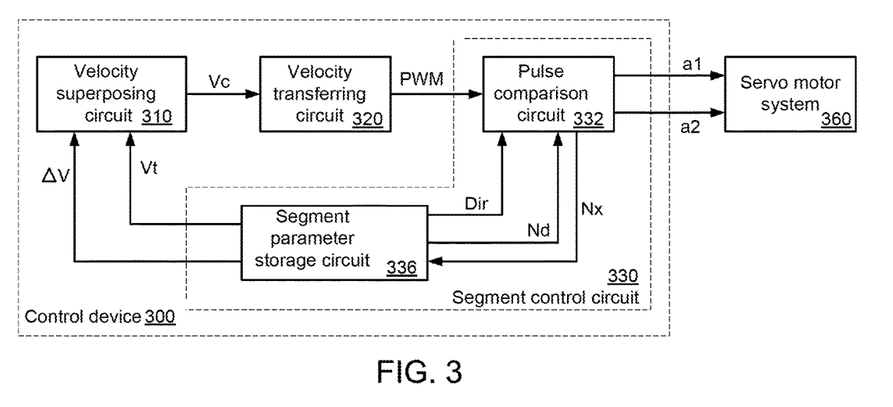
FIG. 3 is a schematic functional block diagram illustrating a control device for a servo motor system according to an embodiment of the present invention.

FIG. 3 is a schematic functional block diagram illustrating a control device for a servo motor system according to an embodiment of the present invention. As shown in FIG. 3, the control device 300 is connected to the servo motor system 360. In this embodiment, the control device 300 comprises a velocity superposing circuit 310, a velocity transferring circuit 320 and a segment control circuit 330. The segment control circuit 330 comprises a segment parameter storage circuit 336 and a pulse comparison circuit 332. According to the command pulse wave group containing the signals a1 and a2, the servo motor of the servo motor system 360 is correspondingly controlled. The architecture of the servo motor system 360 of FIG. 3 is similar to that of the servo motor system 115 of FIG. 1, and is not redundantly described herein.

Generally, plural segment parameters are stored in the segment parameter storage circuit 336 by the user. The velocity and position of the servo motor in different segments are controlled according to the plural segment parameters. In this embodiment, each segment parameter contains a target velocity value Vt, an increment ΔV, a predetermined pulse number Nd and a direction signal Dir. The target velocity value Vt is correlated with a target frequency, and the increment ΔV is correlated with a frequency increment.

The velocity superposing circuit 310 receives the target velocity value Vt and the increment ΔV, and generates a present velocity value Vc to the velocity transferring circuit 320 according to the target velocity value Vt and the increment ΔV. The velocity transferring circuit 320 generates a pulse width modulation (PWM) signal according to the present velocity value Vc.

The pulse comparison circuit 332 uses the PWM signal as one signal of the command pulse wave group (e.g., the signal a1 of the command pulse wave group). Moreover, the pulse comparison circuit 332 generates the other signal of the command pulse wave group (e.g., the signal a2 of the command pulse wave group) according to the direction signal Dir. The signal a1 and the signal a2 are collaboratively constituted as the command pulse wave group and transmitted to the servo motor system 360.

Moreover, the pulse comparison circuit 332 receives the predetermined pulse number Nd, and counts the pulse number of the command pulse wave group (e.g., the signal a1) according to the predetermined pulse number Nd. When the pulse number of the command pulse wave group (e.g., the signal a1) reaches the predetermined pulse number Nd, it means that the servo motor reaches the predetermined position of the segment. Meanwhile, the pulse comparison circuit 332 generates a segment stop signal Nx to the segment parameter storage circuit 336. Next, the segment parameter storage circuit 336 provides a next segment parameter to the velocity superposing circuit 310 and the pulse comparison circuit 332.

As mentioned above, the segment control circuit 330 of the control device 300 can control the velocity and position of the servo motor in different segments are controlled according to the plural segment parameters. The circuitry and the operation of the control device 300 will be illustrated in more details as follows.

Figure 4A:
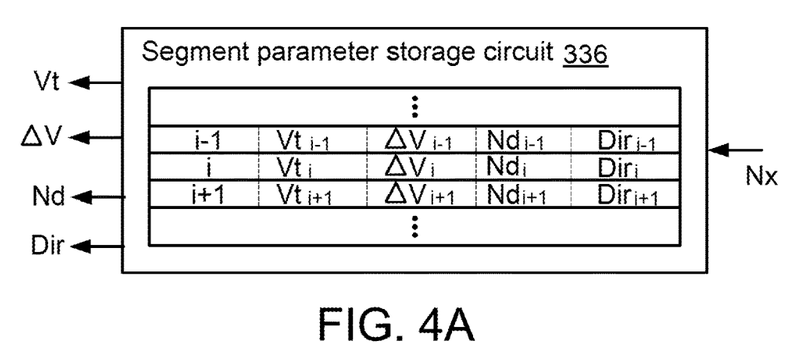
FIG. 4A schematically illustrates the segment parameter storage circuit of the control device according to the embodiment of the present invention.

FIG. 4A schematically illustrates the segment parameter storage circuit of the control device according to the embodiment of the present invention. The segment parameter storage circuit 336 comprises a memory for storing the plural segment parameters. As shown in FIG. 4A, the (i−1)-th segment parameter contains a target velocity value $Vt_{i-1}$, an increment $\Delta V_{i-1}$, a predetermined pulse number $Nd_{i-1}$ and a direction signal $Dir_{i-1}$. In addition, the i-th segment parameter contains a target velocity value $Vt_i$, an increment $\Delta V_i$, a predetermined pulse number $Nd_i$ and a direction signal $Dir_i$. In addition, the (i+1)-th segment parameter contains a target velocity value $Vt_{i+1}$, an increment $\Delta V_{i+1}$, a predetermined pulse number $Nd_{i+1}$ and a direction signal $Dir_{i+1}$.

For example, the segment parameters of the (i−1)-th segment parameter ($Vt_{i-1}$, $\Delta V_{i-1}$, $Nd_{i-1}$, $Dir_{i-1}$) have been outputted from the segment parameter storage circuit 336. When the segment stop signal Nx is received by the segment parameter storage circuit 336, the segment parameter storage circuit 336 outputs the segment parameters of the i-th segment parameter ($Vt_i$, $\Delta V_i$, $Nd_i$, $Dir_i$). Consequently, the PWM signal is generated according to the target velocity value $Vt_i$ and the increment $\Delta V_i$ so as to control the velocity of the servo motor, and the pulse number of the PWM signal is counted according to the predetermined pulse number $Nd_i$ so as to control the position of the servo motor. When the segment stop signal Nx is received by the segment parameter storage circuit 336 again, the segment parameter storage circuit 336 outputs the segment parameters of the (i+1)-th segment parameter ($Vt_{i+1}$, $\Delta V_{i+1}$, $Nd_{i+1}$, $Dir_{i+1}$).

Figure 4B:
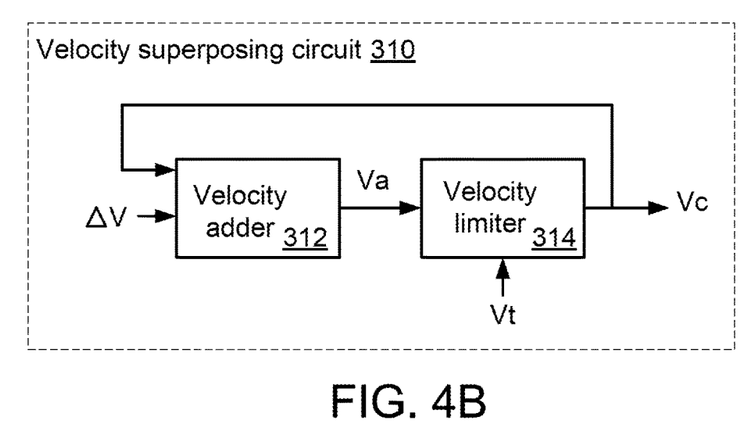
FIG. 4B is a schematic functional block diagram illustrating the velocity superposing circuit of the control device according to the embodiment of the present invention.

FIG. 4B is a schematic functional block diagram illustrating the velocity superposing circuit of the control device according to the embodiment of the present invention. As shown in FIG. 4B, the velocity superposing circuit 310 comprises a velocity adder 312 and a velocity limiter 314. After the velocity adder 312 receives the increment ΔV, the present velocity value Vc and the increment ΔV are superposed with each other to generate a superposed velocity value Va by the velocity adder 312. The superposed velocity value Va is transmitted to the velocity limiter 314. In case that the increment ΔV is a positive value, the superposed velocity value Va gradually increases and thus the velocity of the servo motor increases. Whereas, in case that the increment ΔV is a negative value, the superposed velocity value Va gradually decreases and thus the velocity of the servo motor decreases.

Moreover, the velocity limiter 314 judges the relationship between the target velocity value Vt and the superposed velocity value Va at an interpolation interval τ. Before the superposed velocity value Va reaches the target velocity value Vt, the superposed velocity value Va is outputted as the present velocity value Vc by the velocity limiter 314. When the superposed velocity value Va reaches the target velocity value Vt, the superposed velocity value Va is outputted as the present velocity value Vc by the velocity limiter 314 and the present velocity value Vc is kept unchanged.

Moreover, when the velocity adder 312 receives the updated increment ΔV and the target velocity value Vt and the next segment is activated, the present velocity value Vc is the target velocity value Vt of the previous segment. The above process is repeatedly done.

In other words, whenever the velocity adder 312 receives the updated increment ΔV and the target velocity value Vt, the velocity adder 312 gradually changes the present velocity value Vc until the present velocity value Vc reaches the target velocity value Vt. In an embodiment, the interpolation interval τ is a fixed time period. It is noted that the interpolation interval τ is not restricted to the fixed time period. That is, the length of the interpolation interval τ may be varied according to the practical requirements.

Figure 4C:
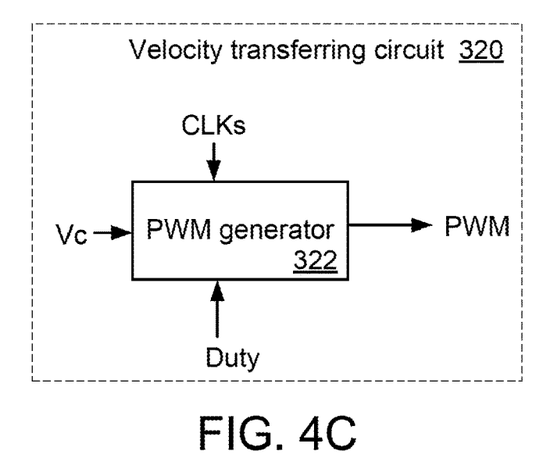
FIG. 4C schematically illustrates the velocity transferring circuit of the control device according to the embodiment of the present invention.

FIG. 4C schematically illustrates the velocity transferring circuit of the control device according to the embodiment of the present invention. As shown in FIG. 4C, the velocity transferring circuit 320 comprises a PWM generator 322. The PWM generator 322 receives a system clock CLKs, the present velocity value Vc and a duty cycle value Duty. Moreover, the velocity transferring circuit 320 performs a frequency-dividing operation on the system clock CLKs according to the present velocity value Vc and generates the PWM signal according to the duty cycle value Duty.

For example, the system clock CLKs is 100 MHz, the present velocity value Vc is 100 KHz, and the duty cycle value Duty is 0.5. Under this circumstance, the PWM generator 322 generates the PWM signal at a duty cycle of 50% and at a frequency of 100 KHz.

As mentioned above, the frequency corresponding to the present velocity value Vc is used as the frequency of the PWM signal by the velocity transferring circuit 320. It is noted that numerous modifications and alterations may be made while retaining the teachings of the invention. In a variant example, the frequency of the PWM signal is in proportion to the present velocity value Vc. For example, the frequency corresponding to the present velocity value Vc is five times the frequency of the PWM signal.

Figure 4D:
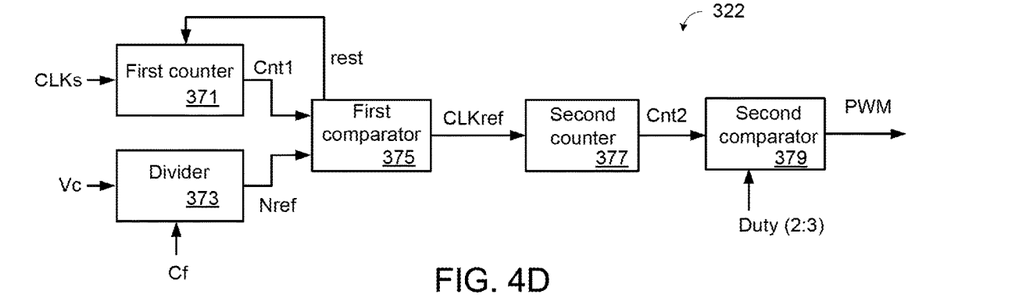
FIG. 4D is a schematic functional block diagram illustrating the PWM generator of the control device according to the embodiment of the present invention.
Figure 4E:
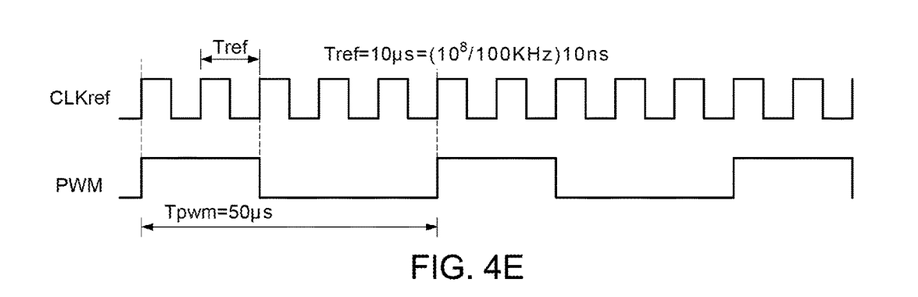
FIG. 4E is a schematic timing waveform diagram illustrating associated signals of the PWM generator of FIG. 4D.

FIG. 4D is a schematic functional block diagram illustrating the PWM generator of the control device according to the embodiment of the present invention. FIG. 4E is a schematic timing waveform diagram illustrating associated signals of the PWM generator of FIG. 4D. In this embodiment, the system clock CLKs is 100 MHz (i.e., period=10 ns), the present velocity value Vc is 100 KHz, and the duty cycle value Duty is 0.4 (i.e., the ratio of the high level to the low level is 2:3). The PWM generator 322 as shown in FIG. 4D is presented herein for purpose of illustration and description only.

In this embodiment, the PWM generator 322 comprises a first counter 371, a second counter 377, a first comparator 375, a second comparator 379 and a divider 373.

The first counter 371 counts the pulse number of the system clock CLKs, and outputs a first count value Cnt1 to the first comparator 375. The divider 373 divides a frequency division constant Cf by the present velocity value Vc to generate a reference value Nref. For example, if the frequency division constant Cf is $10^8$, the reference value Nref is $10^3$ (i.e., $10^8/100K=10^3$).

The first comparator 375 receives the first count value Cnt1 and the reference value Nref. When the first count value Cnt1 reaches the reference value Nref, the first comparator 375 switches a level state of a reference clock CLKref. Meanwhile, the first comparator 375 resets the first counter 371, and thus the first count value Cnt1 is zeroed. After the first count value Cnt1 is zeroed, the first counter 371 counts the pulse number of the system clock CLKs again. As shown in FIG. 4E, the period of the reference clock CLKref outputted from the first comparator 375 is 10 μs.

The second counter 377 counts the pulse number of the reference clock CLKref, and outputs a second count value Cnt2 to the second comparator 379. The second comparator 379 compares the second count value Cnt2 according to the duty cycle value Duty (=0.4), and generates the PWM signal.

In an embodiment, the second comparator 379 compares the number of times of changing the second count value Cnt2. After the second count value Cnt2 is changed two times, the PWM signal is switched from the high level state to the low level state by the second comparator 379. Moreover, after the second count value Cnt2 is changed three times, the PWM signal is switched from the low level state to the high level state by the second comparator 379. The above procedures are periodically performed. Consequently, as shown in FIG. 4E, the PWM signal with the period Tpwm of 50 μs is generated.

Figure 5A:
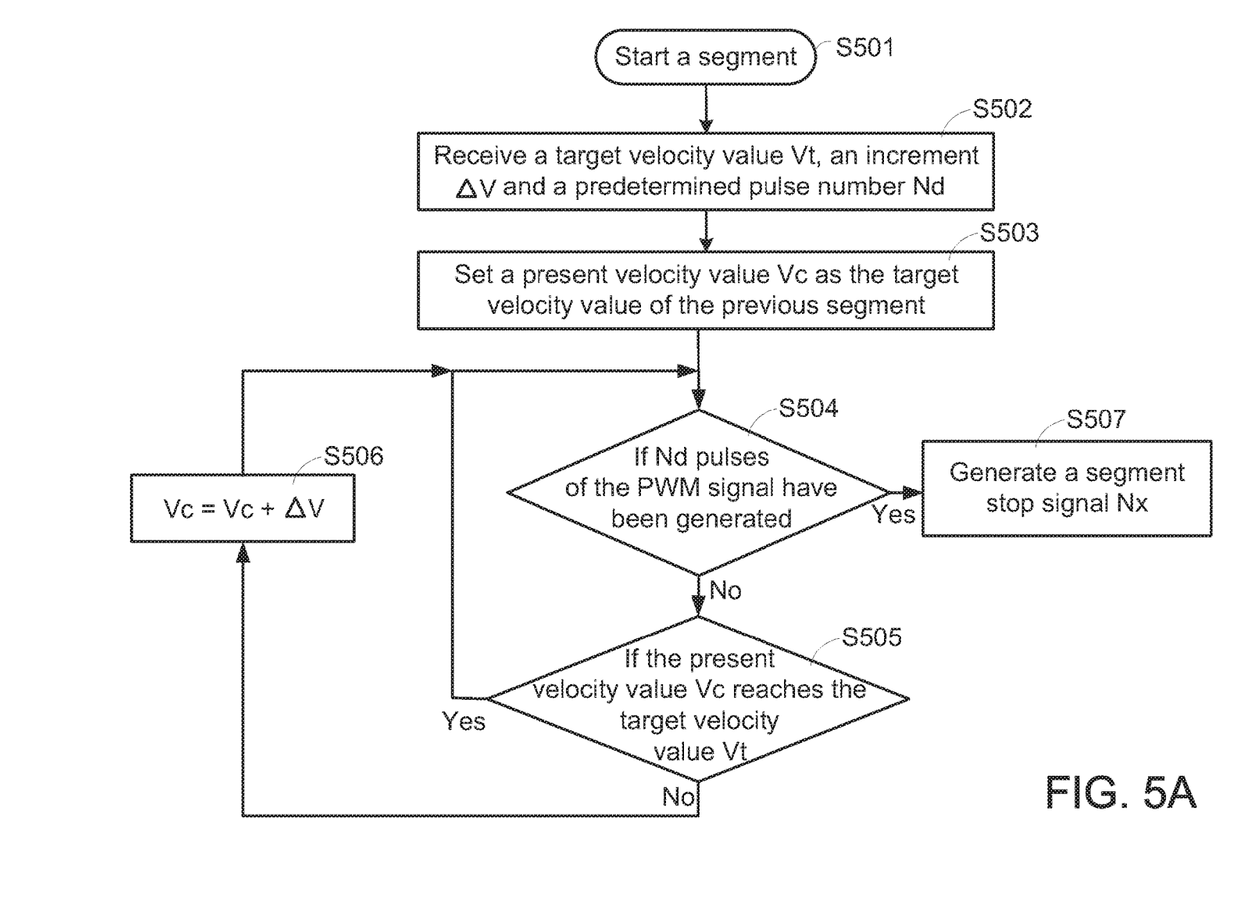
FIG. 5A is a flowchart illustrating a control method for a servo motor system according to an embodiment of the present invention.

FIG. 5A is a flowchart illustrating a control method for a servo motor system according to an embodiment of the present invention. The control method is applied to the control device 300 of FIG. 3. The control device 300 continuously generates the PWM signal and determines the frequency of the PWM signal according to the present velocity value Vc. The PWM signal is transmitted to the servo motor system 360.

After a segment starts (Step S501), a target velocity value Vt, an increment ΔV and a predetermined pulse number Nd are received (Step S502). Then, a present velocity value Vc is set as the target velocity value of the previous segment (Step S503).

Then, a step S504 judges whether Nd pulses of the PWM signal have been generated. If Nd pulses of the PWM signal have been generated, a segment stop signal Nx is generated (Step S507). Whereas, if Nd pulses of the PWM signal have not been generated, a step S505 is performed to judge whether the present velocity value Vc reaches the target velocity value Vt (Step S505).

If the present velocity value Vc reaches the target velocity value Vt, the step S504 is repeatedly done. Whereas, if the present velocity value Vc does not reach the target velocity value Vt, the present velocity value Vc is updated to the sum of the present velocity value Vc and the increment ΔV after an interpolation interval τ (Step S506) and the step S504 is repeatedly done.

Moreover, after the segment stop signal Nx is received by the segment parameter storage circuit 336, it means that this segment is stopped. Then, the next segment is continuously performed, and the flowchart of FIG. 5A is repeatedly done.

Figure 5B:
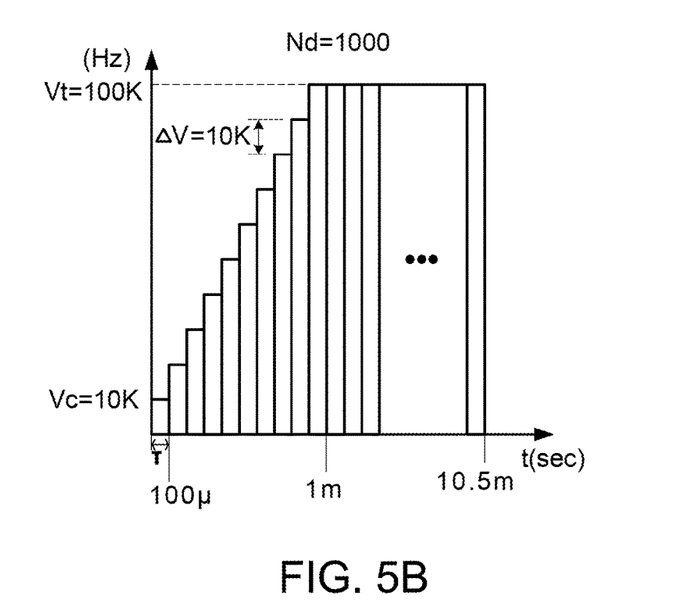
FIG. 5B schematically illustrates the change of the frequency of the PWM signal by the control method of FIG. 5A.

FIG. 5B schematically illustrates the change of the frequency of the PWM signal by the control method of FIG. 5A. For example, the target velocity value of the previous segment is 10 KHz. Consequently, the present velocity value Vc is set as 10 KHz. Moreover, the increment ΔV is 10 KHz. Consequently, the present velocity value Vc increases 10 KHz at an interpolation interval τ (=100 μs). At the time point 1 ms, the present velocity value Vc reaches the target velocity value Vt (i.e., 100 KHz).

In FIG. 5B, the total area of rectangular bars is the pulse number of the PWM signal. At the time point near 10.5 ms, Nd pulses (=1000 pulses) of the PWM signal have been generated. Meanwhile, the servo motor reaches the predetermined position of the segment. Then, the segment stop signal Nx is issued to the segment parameter storage circuit 336 in order to activate the next segment.

Since the increment ΔV relative to the present velocity value Vc is fixed, the servo motor is unstable because of the influence of the inertia. For solving this drawback, the velocity superposing circuit 310 is further modified.

Figure 6:
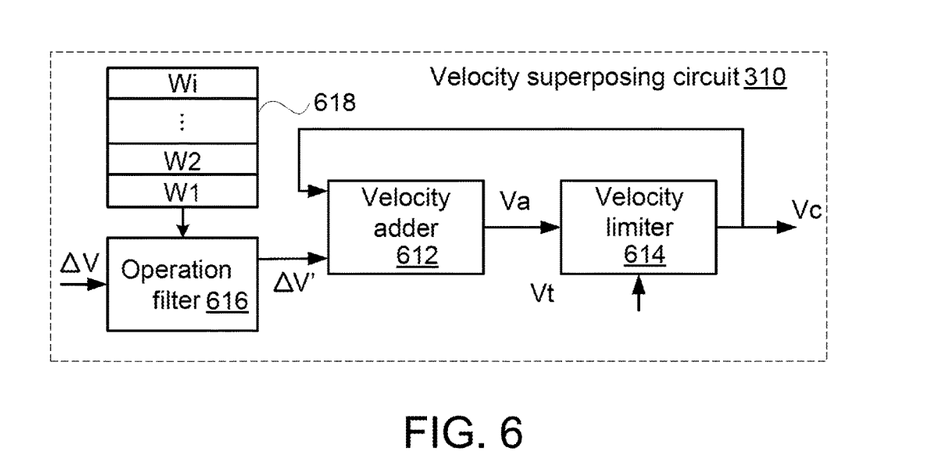
FIG. 6 is a schematic functional block diagram illustrating another exemplary velocity superposing circuit used in the control device of the present invention.

FIG. 6 is a schematic functional block diagram illustrating another exemplary velocity superposing circuit used in the control device of the present invention. As shown in FIG. 6, the velocity superposing circuit 310 comprises a weighting look-up table 618, an operation filter 616, a velocity adder 612 and a velocity limiter 614. The weighting look-up table 618 records plural weighting values W1~Wi. The operation filter 616 successively multiplies the increment ΔV by the corresponding weighting values at an interpolation interval τ. That is, plural modified increments ΔV' are successively generated.

After the velocity adder 612 receives the modified increment ΔV', the present velocity value Vc and the modified increment ΔV' are superposed with each other to generate a superposed velocity value Va by the velocity adder 612.

Moreover, the velocity limiter 614 judges the relationship between the target velocity value Vt and the superposed velocity value Va at the interpolation interval τ. Before the superposed velocity value Va reaches the target velocity value Vt, the superposed velocity value Va is outputted as the present velocity value Vc by the velocity limiter 614. When the superposed velocity value Va reaches the target velocity value Vt, the superposed velocity value Va is outputted as the present velocity value Vc by the velocity limiter 614 and the present velocity value Vc is kept unchanged.

Moreover, when the velocity adder 612 receives the updated increment ΔV and the target velocity value Vt and the next segment is activated, the present velocity value Vc is the target velocity value Vt of the previous segment. The above process is repeatedly done.

In other words, whenever the velocity superposing circuit 310 receives the modified increment $\Delta V'$ and the target velocity value Vt, the velocity superposing circuit 310 gradually changes the present velocity value Vc until the present velocity value Vc reaches the target velocity value Vt. In this embodiment, the weighting values of the weighting look-up table 618 are time-variant values. Consequently, the present velocity value Vt is not constantly changed.

In case that the plural weighting values in the weighting look-up table 618 are identical values (e.g., W1~Wi=1), the operations of the velocity superposing circuit 310 of FIG. 6 are identical to the operations of the velocity superposing circuit 310 of FIG. 4B.

Figure 7A:
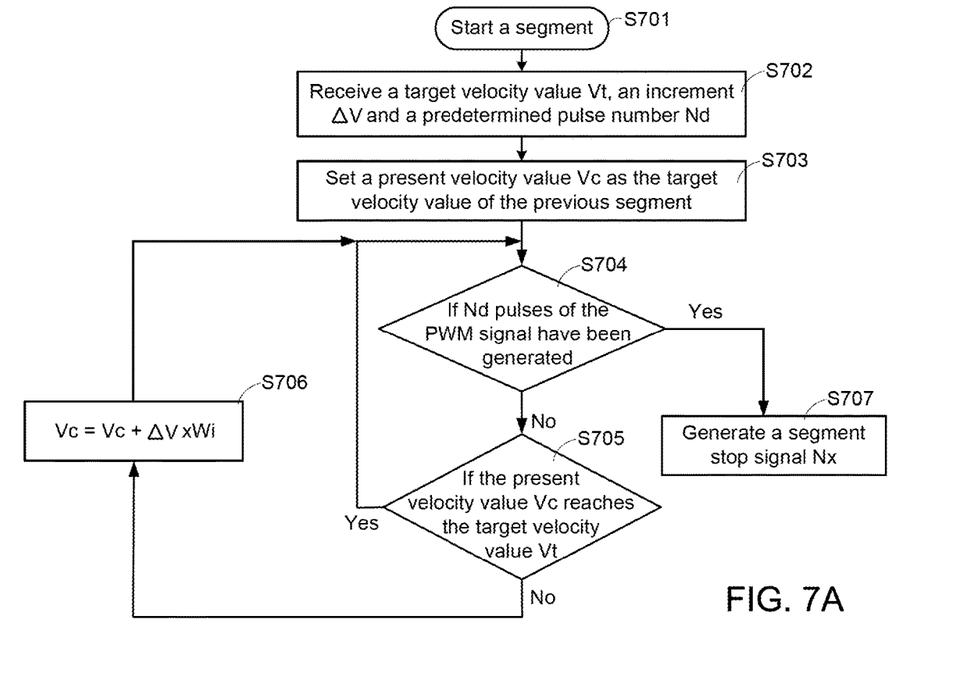
FIG. 7A is a flowchart illustrating a control method for a servo motor system according to another embodiment of the present invention.

FIG. 7A is a flowchart illustrating a control method for a servo motor system according to another embodiment of the present invention. The control method is applied to the control device 300 of FIG. 3. The control device 300 continuously generates the PWM signal and determines the frequency of the PWM signal according to the present velocity value Vc. The PWM signal is transmitted to the servo motor system 360.

After a segment starts (Step S701), a target velocity value Vt, an increment $\Delta V$ and a predetermined pulse number Nd are received (Step S702). Then, a present velocity value Vc is set as the target velocity value of the previous segment (Step S703).

Then, a step S704 judges whether Nd pulses of the PWM signal have been generated. If Nd pulses of the PWM signal have been generated, a segment stop signal Nx is generated (Step S707). Whereas, if Nd pulses of the PWM signal have not been generated, a step S705 is performed to judge whether the present velocity value Vc reaches the target velocity value Vt (Step S705).

If the present velocity value Vc reaches the target velocity value Vt, the step S704 is repeatedly done. Whereas, if the present velocity value Vc does not reach the target velocity value Vt, the present velocity value Vc is updated to the sum of the present velocity value Vc and the product of the increment $\Delta V$ and the corresponding weighting value (i.e., Vc=Vc+$\Delta V \times$Wi) after an interpolation interval $\tau$ (Step S706) and the step S704 is repeatedly done.

Moreover, after the segment stop signal Nx is received by the segment parameter storage circuit 336, it means that this segment is stopped. Then, the next segment is continuously performed, and the flowchart of FIG. 7A is repeatedly done.

Figure 7B:
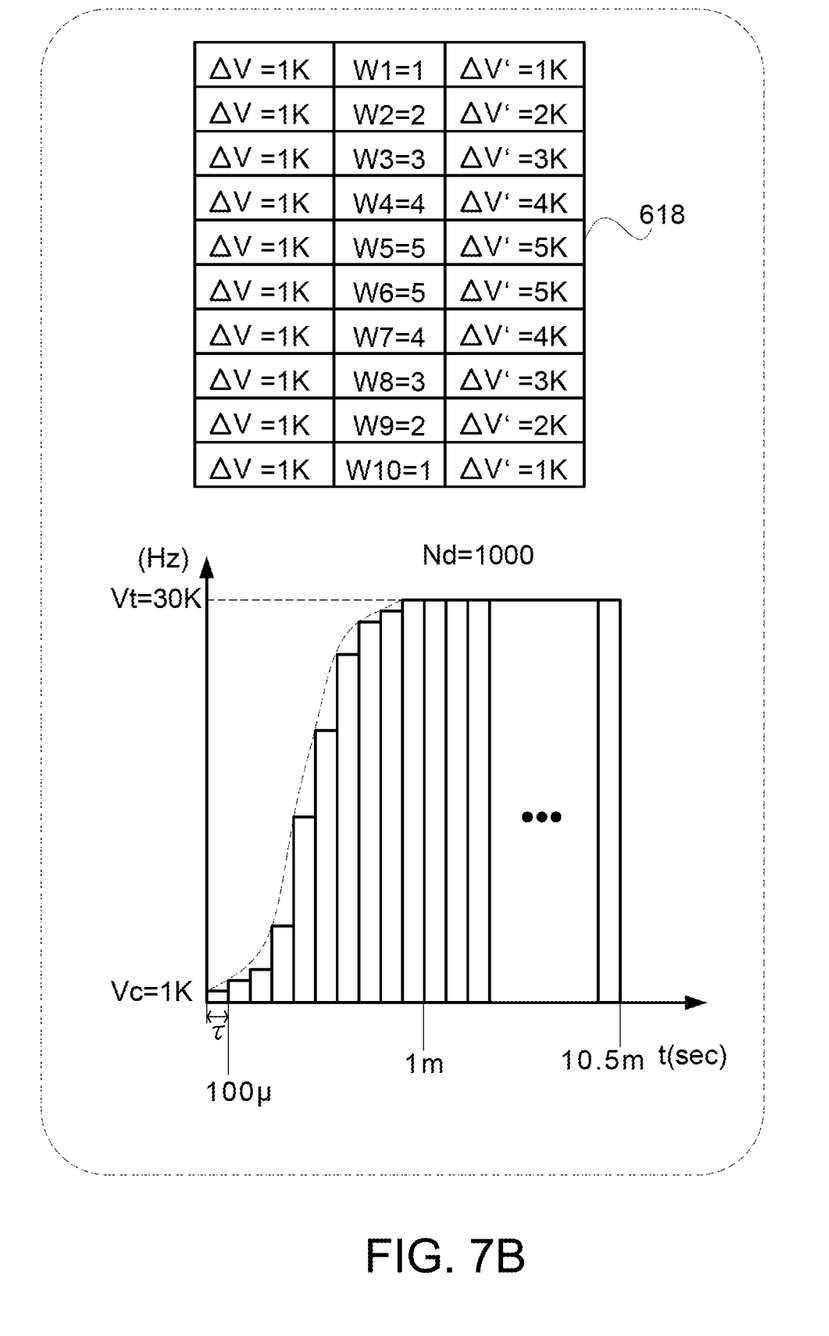
FIG. 7B schematically illustrates the change of the frequency of the PWM signal by the control method of FIG. 7A.

FIG. 7B schematically illustrates the change of the frequency of the PWM signal by the control method of FIG. 7A. For example, the target velocity value of the previous segment is 1 KHz. Consequently, the present velocity value Vc is set as 1 KHz. Moreover, the present velocity value Vc is changed to the target velocity value Vt (30 KHz). Moreover, the weighting values of the weighting look-up table 618 are gradually increased and then gradually decreased. In other words, the modified increments $\Delta V'$ are gradually increased and then gradually decreased.

Since the present velocity value Vc is not changed at the fixed increments $\Delta V$, the operation of the servo motor is more stable.

In FIG. 7B, the total area of rectangular bars is the pulse number of the PWM signal. At the time point near 10.5 ms, Nd pulses (=1000 pulses) of the PWM signal have been generated. Meanwhile, the servo motor reaches the predetermined position of the segment. Then, the segment stop signal Nx is issued to the segment parameter storage circuit 336 in order to activate the next segment.

From the above descriptions, the present invention provides the control device and the control method for the servo motor system. The PWM signal is used as the signal a1 according to the plural segment parameters, and the direction signal of the segment parameter is used to generate the signal a2 for controlling forward/reverse rotation. The signal a1 and the signal a2 are collaboratively constituted as a one pulse direction command in order to control the operations of the servo motor system. It is noted that numerous modifications and alterations may be made while retaining the teachings of the invention. For example, according the concepts of the present invention, a pair of PWM signals are produced to constitute the command pulse wave group is in an A/B phase-pulse format or a clockwise and counterclockwise-pulse format.

Moreover, in the embodiment of FIG. 4A, the segment parameter storage circuit 336 successively outputs the segment parameters from the low segment to the high segment. In another, the segment parameter storage circuit provides more fields to program the sequence of outputting the segment parameters from the segment parameter storage circuit.

Figure 8:
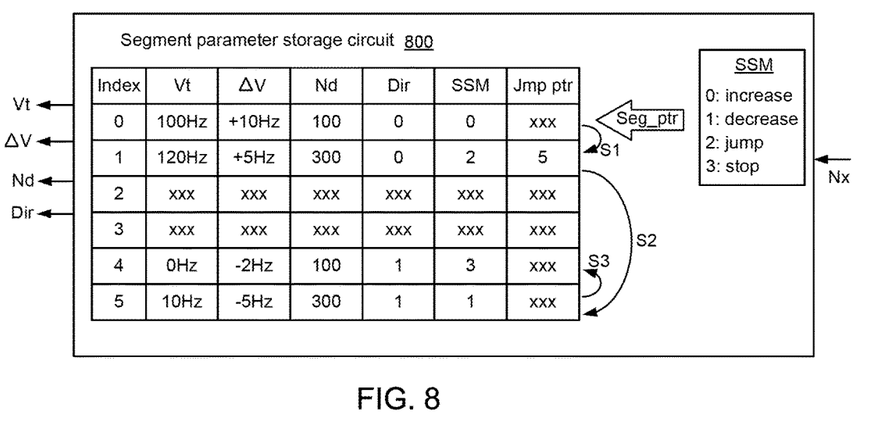
FIG. 8 schematically illustrates another exemplary segment parameter storage circuit of the control device.

FIG. 8 schematically illustrates another exemplary segment parameter storage circuit of the control device. The segment parameter storage circuit 800 comprises a memory for storing the plural segment parameters. The fields of each segment contains a segment index field (index), a segment switch management field (SSM), a segment jump indication field (Jump ptr), a target velocity value value field (Vt), an increment filed ($\Delta V$), a predetermined pulse number field (Nd) and a direction signal field (Dir). The segment switch management field (SSM) is used for controlling the segment point (seg_ptr). In the SSM field, "0" indicates the increase of the segment number by 1, "1" indicates the decrease of the segment number by 1, "2" indicates the segment jump, and "3" indicates the segment stop.

In the initial state, the initial velocity is zero and the segment point (seg_ptr) points to the segment 0. Meanwhile, the target velocity value Vt (100 Hz), the increment $\Delta V$ (+10 Hz), the predetermined pulse number field Nd (100) and the direction signal Dir (0) of the segment 0 are outputted from the segment parameter storage circuit 800. That is, the PWM signal increases from 0 Hz to the target velocity value (Vt=100 Hz) at the increment $\Delta V$ (+10 Hz) at an interpolation interval $\tau$. In the direction signal Dir, "0" indicates the first direction of the servo motor. When the 100 pulses of the PWM signal have been generated, the segment parameter storage circuit 800 receives the segment stop signal Nx.

In the segment 0, "0" of the SSM field indicates the increase of the segment number by 1. Consequently, when the segment parameter storage circuit 800 receives the segment stop signal Nx, the segment point (seg_ptr) points to the segment 1 (i.e., along the path S1). Meanwhile, the target velocity value Vt (120 Hz), the increment $\Delta V$ (+5 Hz), the predetermined pulse number field Nd (300) and the direction signal Dir (0) of the segment 1 are outputted from the segment parameter storage circuit 800. That is, the PWM signal increases from 100 Hz to the target velocity value (Vt=120 Hz) at the increment $\Delta V$ (+5 Hz) at the interpolation interval $\tau$. In the direction signal Dir, "0" indicates the first direction of the servo motor. When the 300 pulses of the PWM signal have been generated, the segment parameter storage circuit 800 receives the segment stop signal Nx.

In the segment 1, "2" of the SSM field indicates the segment jump, and the segment jump indication field (Jump ptr) indicates the segment 5. Consequently, when the segment parameter storage circuit 800 receives the segment stop signal Nx, the segment point (seg_ptr) points to the segment 5 (i.e., along the path S2). Meanwhile, the target velocity value Vt (10 Hz), the increment ΔV (−5 Hz), the predetermined pulse number field Nd (300) and the direction signal Dir (1) of the segment 5 are outputted from the segment parameter storage circuit 800. That is, the PWM signal decreases from 120 Hz to the target velocity value (Vt=10 Hz) at the increment ΔV (−5 Hz) at the interpolation interval τ. In the direction signal Dir, "1" indicates the second direction of the servo motor. When the 300 pulses of the PWM signal have been generated, the segment parameter storage circuit 800 receives the segment stop signal Nx.

In the segment 5, "1" of the SSM field indicates the decrease of the segment number by 1. Consequently, when the segment parameter storage circuit 800 receives the segment stop signal Nx, the segment point (seg_ptr) points to the segment 4 (i.e., along the path S3). Meanwhile, the target velocity value Vt (0 Hz), the increment ΔV (−2 Hz), the predetermined pulse number field Nd (100) and the direction signal Dir (1) of the segment 4 are outputted from the segment parameter storage circuit 800. That is, the PWM signal increases from 10 Hz to the target velocity value (Vt=0 Hz) at the increment ΔV (−2 Hz) at the interpolation interval τ. In the direction signal Dir, "1" indicates the second direction of the servo motor. When the 300 pulses of the PWM signal have been generated, the segment parameter storage circuit 800 receives the segment stop signal Nx.

In the segment 4, "3" of the SSM field indicates the segment stop. When the segment parameter storage circuit 800 receives the segment stop signal Nx, the overall flowchart is ended.

More especially, the sequence of outputting the segment parameters from the segments of the segment parameter storage circuit 800 can be set by the user according to the practical requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control device for generating a command pulse wave group to a servo motor system, the control device comprising:
    a segment parameter storage circuit storing plural segment parameters, wherein each segment parameter contains a target velocity value, an increment and a predetermined pulse number, wherein after the segment parameter storage circuit outputs a first segment parameter and receives a segment stop signal, the segment parameter storage circuit outputs a second segment parameter;
    a velocity superposing circuit receiving the target velocity value and the increment of the second segment parameter and generating a present velocity value, wherein the preset velocity is changed from the target velocity value of the first segment parameter to the target velocity value of the second segment parameter;
    a velocity transferring circuit receiving the present velocity value and generating a pulse width modulation signal according to the present velocity value; and
    a pulse comparison circuit for transferring the pulse width modulation signal into a first signal of the command pulse wave group, wherein the pulse comparison circuit receives the predetermined pulse number and counts a pulse number of the pulse width modulation signal, wherein when the pulse number of the pulse width modulation signal reaches the predetermined pulse number, the pulse comparison circuit generates the segment stop signal.

2. The control device as claimed in claim 1, wherein the command pulse wave group is in an A/B phase-pulse format, a one pulse direction-pulse format or a clockwise and counterclockwise-pulse format.

3. The control device as claimed in claim 1, wherein each segment parameter further contains a direction signal, wherein the pulse comparison circuit generates a second signal of the command pulse wave group according to the direction signal.

4. The control device as claimed in claim 1, wherein the segment parameter storage circuit comprises a memory for storing the plural segment parameters.

5. The control device as claimed in claim 1, wherein the velocity superposing circuit comprises:
    a velocity adder for adding the present velocity value and the increment, thereby generating a superposed velocity value; and
    a velocity limiter for transferring the superposed velocity value into the present velocity value, wherein when the superposed velocity value reaches the target velocity value of the second segment parameter, the superposed velocity value is transferred into the present velocity value and the preset velocity is kept unchanged.

6. The control device as claimed in claim 5, wherein the velocity adder adds the present velocity value and the increment to generate the superposed velocity value at an interpolation interval.

7. The control device as claimed in claim 6, wherein the interpolation interval is a changeable time period.

8. The control device as claimed in claim 1, wherein the velocity transferring circuit comprises a pulse width modulation generator, wherein the pulse width modulation generator receives a system clock, the present velocity value and a duty cycle value, and generates the pulse width modulation generator according to the system clock, the present velocity value and the duty cycle value.

9. The control device as claimed in claim 8, wherein a frequency of the pulse width modulation signal is in proportion to the present velocity value, and a duty cycle of the pulse width modulation signal is determined according to the duty cycle value.

10. The control device as claimed in claim 8, wherein the pulse width modulation generator comprises:
    a first counter for counting the system clock, thereby generating a first count value;
    a divider for dividing a frequency division constant by the present velocity value, thereby generating a reference value;
    a first comparator receiving the first count value and the reference value, wherein when the first count value reaches the reference value, the first comparator switches a level state of a reference clock and resets the first counter;
    a second counter for counting the reference clock, thereby generating a second count value; and
    a second comparator comparing the second count value according to the duty cycle value, thereby generating the pulse width modulation signal.

11. A control method for a control device, the control device generating a command pulse wave group to a servo motor system, the control method comprising steps of:

(a) controlling the servo motor system in response to a segment stop signal, wherein the segment stop signal represents to stop a first segment and to start a second segment, the command pulse wave group is generated according to the first segment parameter during the first segment, and the command pulse wave group is generated according to the second segment parameter during the second segment;

(b) receiving a target velocity value, an increment and a predetermined pulse number of the second segment parameter;

(c) setting a present velocity value as a target velocity value of the first segment parameter;

(d) judging whether a pulse number of a pulse width modulation signal reaches the predetermined pulse number, wherein if the pulse number of the pulse width modulation signal reaches the predetermined pulse number, the second segment is stopped;

(e) if the pulse number of the pulse width modulation signal does not reach the predetermined pulse number, judging whether the present velocity value reaches the target velocity value, wherein if the present velocity value reaches the target velocity value, the step (d) is repeatedly performed; and (f) if the present velocity value does not reach the target velocity value, updating the present velocity value to a sum of the present velocity value and a modified increment, and repeatedly performing the step (d), wherein the modified increment is equal to a product of the increment and a weighting value, wherein the control device generates the pulse width modulation signal and determines a frequency of the pulse width modulation signal according to the present velocity value, wherein the pulse width modulation signal is used as a first signal of the command pulse wave group.

12. The control method as claimed in claim 11, wherein the command pulse wave group is in an A/B phase-pulse format, a one pulse direction-pulse format or a clockwise and counterclockwise-pulse format.

13. The control method as claimed in claim 11, wherein the second segment parameter further contains a direction signal, wherein the pulse comparison circuit generates a second signal of the command pulse wave group according to the direction signal.

14. The control method as claimed in claim 11, wherein the weighting value is a fixed value.

15. The control method as claimed in claim 11, further comprising a step of receiving a duty cycle value, so that a duty cycle of the pulse width modulation signal is determined according to the duty cycle value.

16. The control method as claimed in claim 11, wherein if the present velocity value does not reach the target velocity value in the step (f), the present velocity value is updated to the sum of the present velocity value and the modified increment at an interpolation interval.

17. The control method as claimed in claim 16, wherein the interpolation interval is a changeable time period.

* * * * *